(12) United States Patent
Karlsson et al.

(10) Patent No.: US 10,136,165 B2
(45) Date of Patent: Nov. 20, 2018

(54) DISTRIBUTED SCALABLE ENCODER RESOURCES FOR LIVE STREAMS

(75) Inventors: Kent Karlsson, Berkeley, CA (US); Fritz Barnes, Alameda, CA (US); Ian Wong, Pleasanton, CA (US); Ola Hållmarker, Segeltorp (SE)

(73) Assignee: MobiTV, Inc., Emeryville, CA (US)

( * ) Notice: Subject to any disclaimer, the term of this patent is extended or adjusted under 35 U.S.C. 154(b) by 491 days.

(21) Appl. No.: 13/232,870

(22) Filed: Sep. 14, 2011

(65) Prior Publication Data

US 2013/0064285 A1   Mar. 14, 2013

(51) Int. Cl.
| | | |
|---|---|---|
| *H04N 19/10* | (2014.01) | |
| *H04N 21/218* | (2011.01) | |
| *H04N 21/2187* | (2011.01) | |
| *H04N 21/231* | (2011.01) | |
| *H04N 21/2343* | (2011.01) | |
| *H04N 21/241* | (2011.01) | |
| *H04N 21/61* | (2011.01) | |
| *H04N 21/845* | (2011.01) | |
| *G06F 9/455* | (2018.01) | |

(52) U.S. Cl.
CPC ..... *H04N 21/2181* (2013.01); *H04N 21/2187* (2013.01); *H04N 21/23103* (2013.01); *H04N 21/23439* (2013.01); *H04N 21/241* (2013.01); *H04N 21/6125* (2013.01); *H04N 21/8456* (2013.01); *G06F 9/45558* (2013.01); *G06F 2209/5022* (2013.01)

(58) Field of Classification Search
CPC .. H04N 7/26; H04N 21/2181; H04N 21/2187; H04N 21/23439; H04N 21/6125; H04N 21/241; H04N 21/23103; H04N 21/8456; G06F 9/45558; G06F 2209/5022
USPC .................................................. 375/240.02
See application file for complete search history.

(56) References Cited

U.S. PATENT DOCUMENTS

2003/0061369 A1 * 3/2003 Aksu ................. H04L 29/06027
                                                                  709/231
2004/0264803 A1 * 12/2004 Castillo ......................... 382/276
(Continued)

OTHER PUBLICATIONS

Hughes, Daniel, et al., "Distributed Video Encoding Over a Peer-to-Peer Network", Retrieved from Internet: < http://www.eprints.lancs.ac.uk/12635/1/DVE.pdf>. (Accessed on May 13, 2013). 2 pgs.

(Continued)

*Primary Examiner* — Christopher S Kelley
*Assistant Examiner* — Matthew K Kwan
(74) *Attorney, Agent, or Firm* — Kwan & Olynick LLP

(57) ABSTRACT

Live media streams are delineated for distributed encoding and fragmentation in a dynamically scalable distributed resource system. In some examples, live MPEG-2 media streams are separated into groups of pictures (GOPs) and converted into jobs for encoding and fragmentation systems. Multiple jobs may be created for the same live media stream to provide for different quality levels for each fragment of each channel. Shared resources such as a pool of dynamically scalable virtual machines can be used to process the individual jobs. Encoded fragments may be H.264 fragments maintained on shared storage. A particular live stream corresponding to a particular quality level can be reconstructed using the encoded fragments.

20 Claims, 7 Drawing Sheets

(56) References Cited

U.S. PATENT DOCUMENTS

| | | | |
|---|---|---|---|
| 2006/0159366 A1* | 7/2006 | Darwish | G06F 17/30017 382/276 |
| 2008/0270523 A1* | 10/2008 | Parmar et al. | 709/203 |
| 2009/0222855 A1* | 9/2009 | Vare | H04L 12/189 725/39 |
| 2010/0118768 A1* | 5/2010 | Thesling | 370/316 |
| 2010/0268764 A1* | 10/2010 | Wee et al. | 709/203 |
| 2011/0096828 A1* | 4/2011 | Chen et al. | 375/240.02 |
| 2011/0305273 A1* | 12/2011 | He et al. | 375/240.02 |

OTHER PUBLICATIONS

Kang, Li-Wei, et al., "Low-Complexity Power-Scalable Multi-View Distributed Video Encoder", Institute of Information Science, Academia Sinica. Retrieved from Internet: <http://www.iis.sinica.edu.tw/papers/lcs/3862-F.pdf>. (Accessed on May 14, 2013) 4 pgs.

Ghatpande, Abhay, et al., "Architecture for Distributed Video Encoding on the Internet", Graduate School of Global Information and Telecommunication Studies, Waseda University. Retrieved from Internet: < http://www.ams.giti.waseda.ac.jp/pdf-files/2003PCSJ_ghatpande.pdf>. (Accessed on May 14, 2013) 2 pgs.

* cited by examiner

DISTRIBUTED SCALABLE ENCODER RESOURCES FOR LIVE STREAMS

TECHNICAL FIELD

The present disclosure relates to distributed scalable encoder resources for live streams.

DESCRIPTION OF RELATED ART

Live streams typically involve encoding or re-encoding prior to transmission to devices and users associated with the devices. In many instances, live streams are encoded into a format such as H.264 (MPEG-4 Part 10). H.264 is a block oriented motion compensation based codec that is widely used in Blu-ray Discs and streaming Internet sources. H.264 encoding can be resource intensive, and specialized hardware is often used to accelerate encoding particularly at high quality levels. In many implementations, live stream encoding servers are configured with application specific hardware to receive one or more channels or live streams and encode the channels or live streams into particular formats. The encoding servers may have the capacity to perform real-time live encoding on up to half a dozen live streams simultaneously.

However, using dedicated hardware for live stream encoding has a number of limitations. Consequently, the techniques and mechanisms of the present invention provide improved mechanisms for performing live stream encoding.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
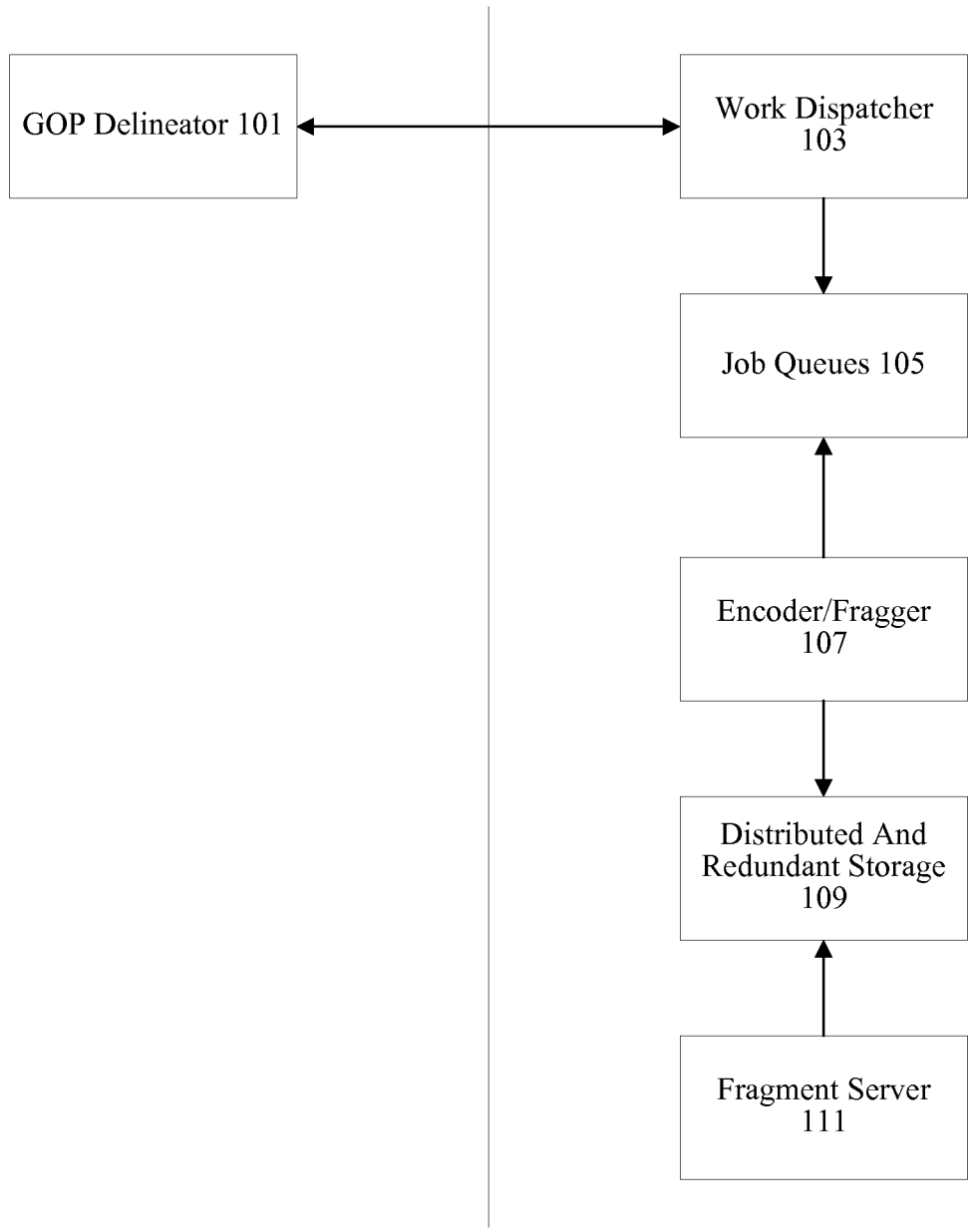
FIG. 1 illustrates one example of a distributed encoding system.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of live media streams. However, it should be noted that live streams include not only real-time live streams but other live and near live streams as well. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Live media streams are delineated for distributed encoding and fragmentation in a dynamically scalable distributed resource system. In some examples, live MPEG-2 media streams are separated into groups of pictures (GOPs) and converted into jobs for encoding and fragmentation systems. Multiple jobs may be created for the same live media stream to provide for different quality levels for each fragment of each channel. Shared resources such as a pool of dynamically scalable virtual machines can be used to process the individual jobs. Encoded fragments may be H.264 fragments maintained on shared storage. A particular live stream corresponding to a particular quality level can be reconstructed using the encoded fragments.

Example Embodiments

A variety of mechanisms are used to deliver media streams to devices. Different devices and different networks may require different variants of a media stream. Some devices may request a higher bit rate or higher resolution stream while changes in network conditions may necessitate a stream or switching to a stream having a lower quality level. Some devices may be able to handle higher resolutions, while others may have limited processing resources or limited screen real estate. Consequently, many systems will encode numerous variants of each media stream. For example, a media provider covering 152 channels may encode 8 variants of each channel for a total of 1216 variants. In some instances, a media provider may actually encode each channel into 8 variants for each supported codec.

Encoding can be resource intensive, particularly when encoding high quality level media streams. Although general purpose hardware can be used, special purpose encoding hardware is often used, particularly for live streams. According to various embodiments, a special purpose encoder may be able to simultaneously encode four variants of a media stream. Two special purpose encoders would be allocated to each channel. In some instances, backup special purpose encoders would sit in standby in the event that a particular special purpose encoder would fail. Although some encoders may periodically be able to handle additional encoding duties, special purpose encoding hardware would typically be overprovisioned to allow some assurance that live stream encoding will occur on schedule.

In some instances, certain variants of particular channels may not be accessed at particular times. Continuing to encode these variants would needlessly consume resources, yet stopping the encoding of these variants in a specialized encoding hardware architecture would not really yield too much benefit.

Overprovisioning and continuous encoding on special purpose encoders or even general purpose computing systems can be inefficient, particularly when redundancy and reliability are desired. Consequently, the techniques of the present invention provide mechanisms for distributed encoding of live media streams. Media streams received from satellite or content provider sources are delineated and distributed to multiple stateless encoders and fragmentation systems or fraggers. In some examples, media streams received from a satellite source as separated into Groups of Pictures (GOPs) and dispatched to different H.264/MPEG-4 part 10 encoders and fraggers in a cloud environment. The encoders and fraggers process their particular assigned jobs and send encoded fragments to distributed storage. Users can then access fragments corresponding to a particular variant media stream of a selected channel. Additional encoders and fraggers can be brought online or taken offline on an as needed basis.

Conventional MPEG-4 files require that a player on a device parse the entire header before any of the data can be decoded. Parsing the entire header can take a notable amount of time, particularly on devices with limited network and processing resources. Consequently, the techniques and mechanisms of the present invention provide a fragmented MPEG-4 framework that allows playback upon receiving a first MPEG-4 file fragment. A second MPEG-4 file fragment can be requested using information included in the first MPEG-4 file fragment. According to various embodiments, the second MPEG-4 file fragment requested may be a fragment corresponding to a higher or lower bit-rate stream than the stream associated with the first file fragment.

MPEG-4 is an extensible container format that does not have a fixed structure for describing media types. Instead, MPEG-4 has an object hierarchy that allows custom structures to be defined for each format. The format description is stored in the sample description ('stsd') box for each stream. The sample description box may include information that may not be known until all data has been encoded. For example, the sample description box may include an average bit rate that is not known prior to encoding.

According to various embodiments, MPEG-4 files are fragmented so that a live stream can be encoded in a distribute architecture on dynamically scalable hardware, recorded, and played back in a close to live manner. MPEG-4 files can be created without having to wait until all content is written to prepare the movie headers. To allow for MPEG-4 fragmentation without out of band signaling, a box structure is provided to include synchronization information, end of file information, and chapter information. According to various embodiments, synchronization information is used to synchronize audio and video when playback entails starting in the middle of a stream. End of file information signals when the current program or file is over. This may include information to continue streaming the next program or file. Chapter information may be used for video on demand content that is broken up into chapters, possibly separated by advertisement slots.

TCP is more widely used than UDP and networking technologies including switch, load balancer, and network card technologies are more developed for TCP than for UDP. Consequently, techniques and mechanisms are provided for delivering fragmented live media over TCP. Sequence information is also maintained and/or modified to allow seamless client device operation. Timing and sequence information in a media stream is preserved.

Requests are exposed as separate files to clients and files should playback on players that handle fragmented MPEG-4. Live or near live, video on demand (VOD), and digital video record (DVR) content can all be encoded on distributed and dynamically scalable encoding resources and processed using fragmentation.

FIG. 1 illustrates one example of a system for performing distributed encoding and fragmentation. According to various embodiments, a media stream is received from a content provider source such as a satellite. In particular embodiments, the media stream is provided in an MPEG-2 format. The media stream is delineated into Groups of Pictures (GOPs) using a GOP delineator 101. The GOP is a group of pictures in coded media and typically includes key and predictive frames. A key frame may be an I-frame or intra-coded frame that represents a fixed image that is independent of other pictures. According to various embodiments, each GOP begins with an I-frame. Predictive frames such as P-frames or predictive-coded frames and B-frames or bidirectionally predictive coded frames contain different information indicating distinctions from reference frames such as a key frame or another predictive frame.

After the media stream is delineated into GOPs, a work dispatcher 103 is notified that a GOP is available. According to various embodiments, the work dispatcher 103 determines if it is the one assigned to work on it as well as what should be done with the GOP. According to various embodiments, the work dispatcher may determine that the GOP should be encoded into 8 different variants. In particular embodiments, the work dispatcher 103 creates a description of what needs to be done and sends the job to job queues 105. According to various embodiments, job queues are first in first out (FIFO) queues that are empty most of the time. Encoders/fraggers 107 request jobs and obtain them from the job queues 105. According to various embodiments, hundreds or thousands of encoders/fraggers reside in a system. In particular embodiments, the same device performs both encoding and fragmentation, but it should be noted that separated devices can be used to perform these operations. According to various embodiments, additional encoder/fraggers can be dynamically brought online when resource usage reaches a particular threshold. Alternatively, encoder/fraggers can be taken offline when resources usage falls beneath a particular floor. According to various embodiments, encoder/fragger 107 is a virtual machine that may reside on one or more physical servers that may or may not have specialized encoding hardware. In particular embodiments, a cloud service determines how many of these virtual machines to use based on established thresholds.

According to various embodiments, a unique identifier is provided for each GOP and a log of each step is maintained. After the encoder/fragger 107 completes processing a job and outputs an encoded fragment, the encoded fragment is maintained in distributed and redundant storage 109. In one example, distributed and redundant storage 109 is a virtualized scale out network attached storage system. The distributed and redundant storage 109 allows a system to maintain numerous fragments on any number of virtualized storage devices.

According to various embodiments, fragments on distributed and redundant storage 109 are accessible by fragment server 111. The fragment server 111 provides the caching layer with fragments for clients. The design philosophy behind the client/server API minimizes round trips and reduces complexity as much as possible when it comes to delivery of the media data to a client device. The fragment server 111 provides live streams and/or DVR configurations.

According to various embodiments, a client device uses a media component that requests fragmented MPEG-4 files, allows trick-play, and manages bandwidth adaptation. In particular embodiments, each client device receives a media stream that is behind a live stream by 12 seconds or more. There may also be server buffering. According to various embodiments, GOP delineation, encoding, fragmentation can occur within a server buffering timeframe. By having numerous encoder/fraggers, capacity can be increased or decreased by percentage points at any time.

Figure 2:
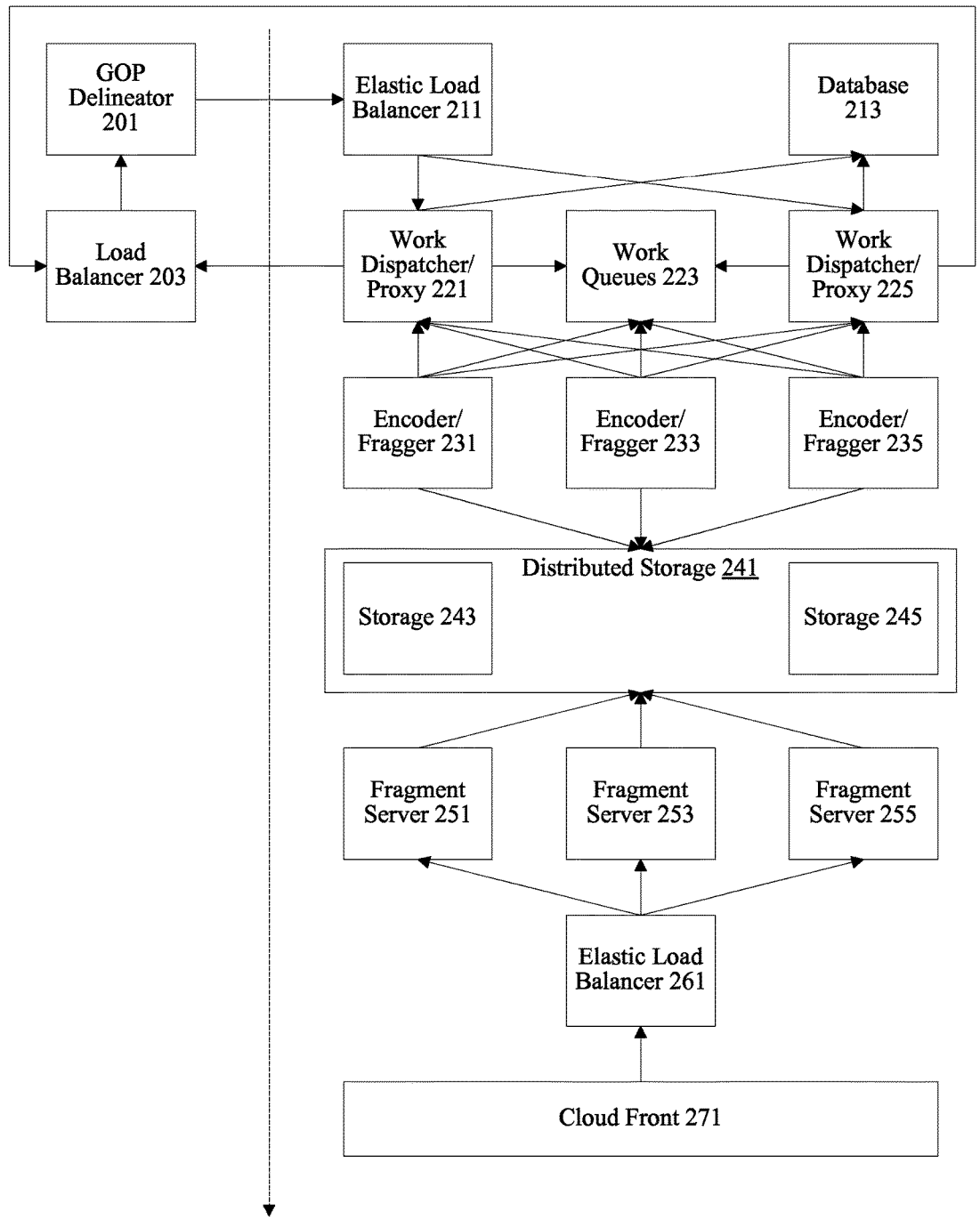
FIG. 2 illustrates one example of a mechanism for implementing distributed encoding redundancy.

FIG. 2 illustrates one example of a distributed, scalable encoding system that provides for redundancy. According to various embodiments, a media stream is received from a content provider source such as a satellite. In particular embodiments, the media stream is provided in an MPEG-2 format. The media stream is delineated into Groups of Pictures (GOPs) using a GOP delineator 201. The GOP is a group of pictures in a coded media and typically includes key and predictive frames. A key frame may be an I-frame or intra-coded frame that represents a fixed image that is independent of other pictures. According to various embodiments, each GOP begins with an I-frame. Predictive frames such as P-frames or predictive-coded frames and B-frames or bidirectionally predictive coded frames contain different information indicating distinctions from a reference frames such as a key frame or another predictive frame. According to various embodiments, multiple GOP delineators 201 are active simultaneously. If a GOP delineator fails, other GOP delineators are available and all GOP delineators can send out notifications.

After the media stream is delineated into GOPs, an elastic load balancer 211 is used to distribute work to work dispatchers 221 and 225. If a work dispatcher fails right as it takes a notification, another notification occurs to a different work dispatcher. Two notifications for the same GOP will end up on two different machines. At each work dispatcher 221 and 225, there may also be a proxy. According to various embodiments, the GOP delineator 201 resides on a different data center than the work dispatchers 221 and 225. Using proxies at work dispatchers 221 and 225 allows for a single transfer of a media stream GOP between data centers.

According to various embodiments, the work dispatchers 221 and 225 determine who is a particular job and what should be done with the GOP. According to various embodiments, the work dispatchers 221 and 225 may determine that the GOP should be encoded into 8 different variants. In particular embodiments, the work dispatchers 221 and 225 create descriptions of what needs to be done and send jobs to job queues 223. According to various embodiments, job queues 223 include an active job queue and a standby job queue. According to various embodiments, job queues are first in first out (FIFO) queues that are empty most of the time. Timeouts may be associated with each job in the queue. Encoders/fraggers 231, 233, and 235 request jobs and obtain them from the job queues 223. In particular embodiments, encoders/fraggers 231, 233, and 235 are identical and can be dynamically activated or deactivated. According to various embodiments, hundreds or thousands of encoders/fraggers reside in a system.

In particular embodiments, the same device performs both encoding and fragmentation, but it should be noted that separated devices can be used to perform these operations. According to various embodiments, additional encoder/fraggers can be dynamically brought online when resource usage reaches a particular threshold. Alternatively, encoder/fraggers can be taken offline when resources usage falls beneath a particular floor. According to various embodiments, encoder/fragger 231, 233, and 235 is a virtual machine that may reside on one or more physical servers that may or may not have specialized encoding hardware. In particular embodiments, a cloud service determines how many of these virtual machines to use based on established thresholds.

According to various embodiments, encoders/fraggers 231, 233, and 235 are stateless. According to various embodiments, a unique identifier is provided for each GOP and a log of each step is maintained. After the encoders/fraggers 231, 233, and 235 complete job and generate encoded fragments, the encoded fragments are maintained in distributed and redundant storage 241. In one example, distributed and redundant storage 241 is a virtualized scale out network attached storage system. The distributed and redundant storage 241 includes nodes 243 and 245, allowing a system to maintain numerous fragments on any number of virtualized storage devices.

According to various embodiments, fragments on distributed and redundant storage 241 are accessible by fragment servers 251, 253, and 255. The fragment servers 251, 253, and 255 provide the caching layer with fragments for clients. The design philosophy behind the client/server API minimizes round trips and reduces complexity as much as possible when it comes to delivery of the media data to a client device. The fragment servers 251, 253, and 255 provide live streams and/or DVR configurations. According to various embodiments, fragment servers operate without state. In particular embodiments, fragments servers operate using HTTP get requests. According to various embodiments, each process allows a flow to continue without having a centralized control point. An elastic load balancer 261 distributes fragment requests from a cloud front 271 to multiple fragment servers 251, 253, and 255.

According to various embodiments, a client device uses a media component that requests fragmented MPEG-4 files, allows trick-play, and manages bandwidth adaptation. In particular embodiments, each client device receives a media stream that is behind a live stream by 12 seconds or more. There may also be server buffering. According to various embodiments, GOP delineation, encoding, fragmentation can occur within a server buffering timeframe. By having numerous encoder/fraggers, capacity can be increased or decreased by percentage points at any time.

Figure 3:
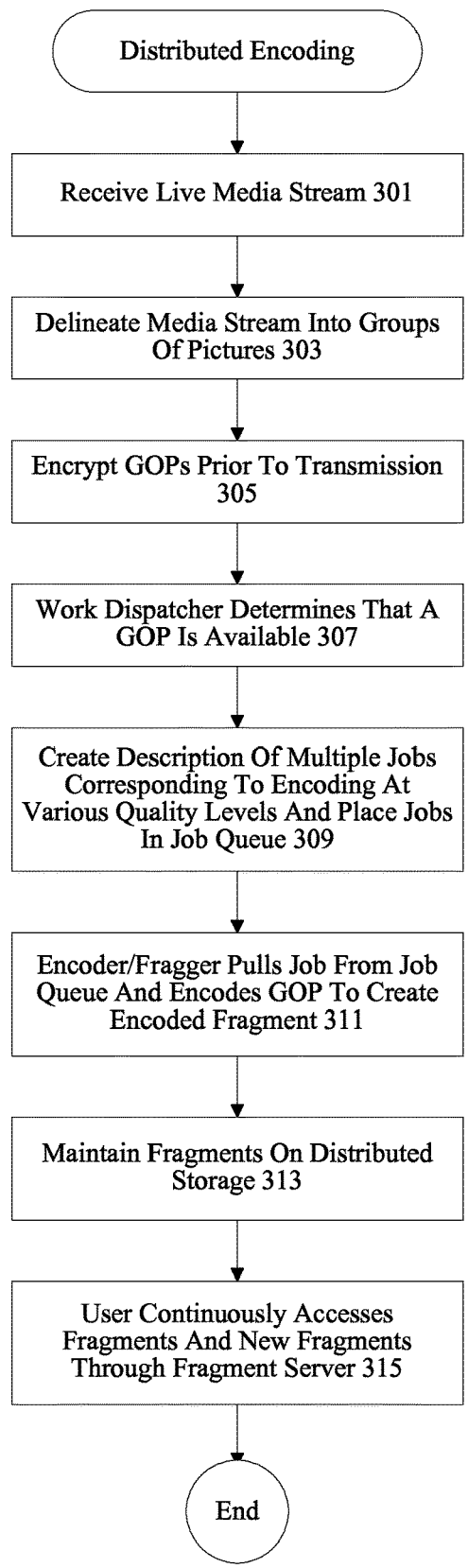
FIG. 3 illustrates a technique for performing distributing encoding and fragmentation.

FIG. 3 illustrates one example of a technique for performing distributed encoding. At 301, a live media stream is received. According to various embodiments, the media stream is a live MPEG-2 media stream received from a satellite receiver. In particular embodiments, a live media stream refers to a media program received at a particular time that is designated for distribution at that particular time. For example, a program may be configured to run at 8 pm PST, and the live media stream is received at the satellite receiver at 8 pm PST. At 303, the media stream is delineated into GOPs. In particular embodiments, key frames are identified and used to begin groups of pictures. The GOPs may be optionally encrypted at this point before transmission at 305.

At 307, a work dispatcher determines that a GOP is available. According to various embodiments, the GOP delineator and the work dispatcher reside in different data centers and it is desirable to have a single GOP transfer instead of redundant GOP transfers. At 309, the work dispatcher creates a description of multiple jobs corresponding to different encoding quality levels and places the job in work queues. An encoder/fragger at 311 pulls the job from the job queue and encodes the GOP into a format such as H.264. Encoded fragments are maintained on distributed storage at 313. A user can then continuously access the encoded fragments at a particular quality level through a fragment server at 315 that allows real-time or near real-time Internet Protocol (IP) distribution of the media stream fragments.

Figure 4:
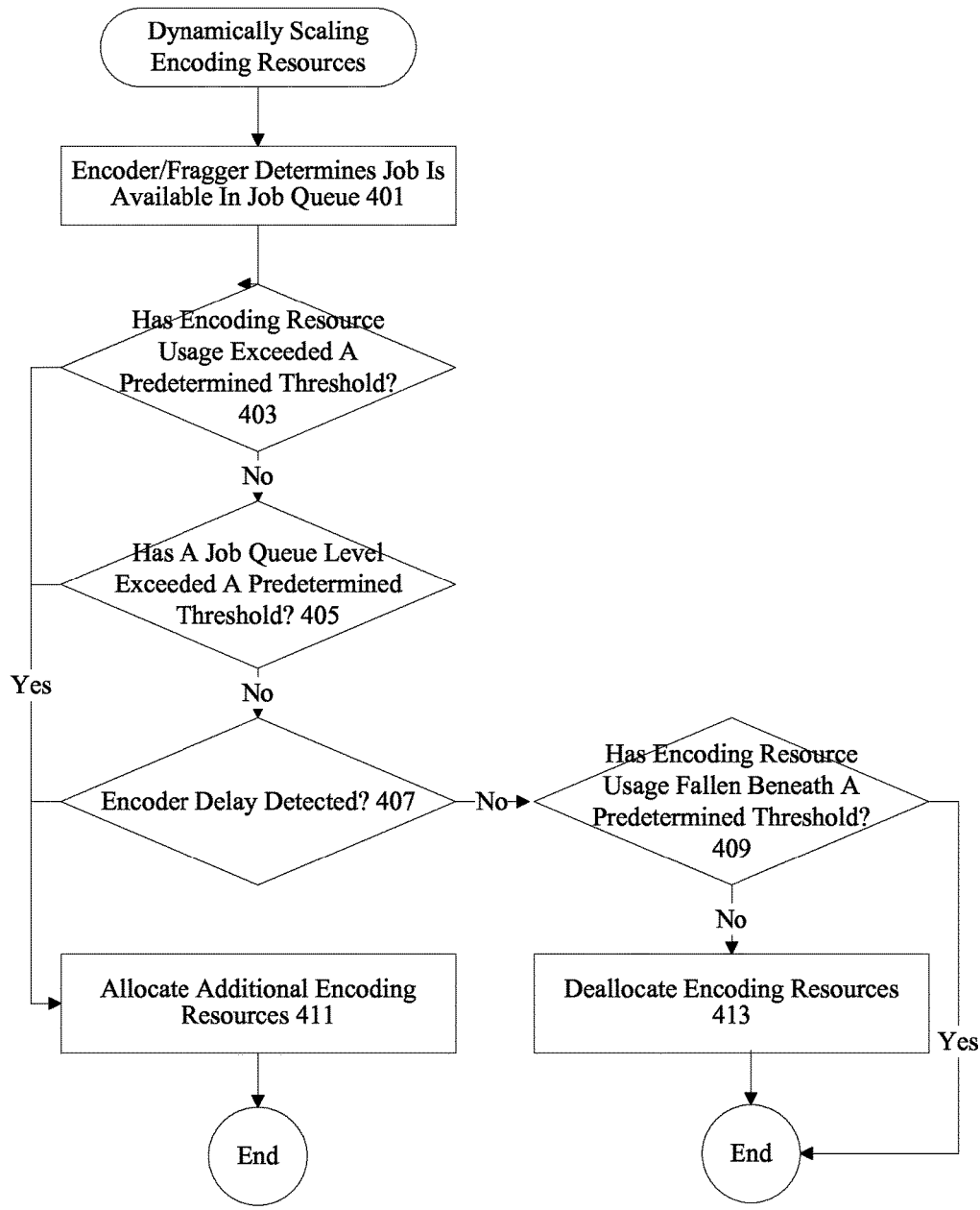
FIG. 4 illustrates a technique for scaling distributed encoding resources.

FIG. 4 illustrates a technique for dynamically scaling encoding resources. At 401, an encoder/fragger determines that a job is available in a job queue. According to various embodiments, additional encoder/fragger resources may be allocated if existing encoder/fragger resources are consumed beyond a particular threshold at 403. For example, if processing resource usage exceeds a particular threshold such as an 80% threshold, an additional virtual machine is allocated for encoding and fragmentation at 411. According to various embodiments, if processing resource usage falls beneath a particular threshold such as a 50% threshold at 409, virtual machines may be taken offline at 413. In particular embodiments, job queue levels can also be used to adjust resource allocation. If job queue levels exceed a particular threshold at 405, additional encoding and fragmentation resources can be allocated at 411. According to various embodiments, live stream media encoding delay may be detected at 407 and used to allocate additional resources at 411. In some examples, it may be determined that requests for fragments may be received far before fragments are available. Higher processing power resources or higher quality resources may be allocated to perform encoding and fragmentation.

Figure 5:
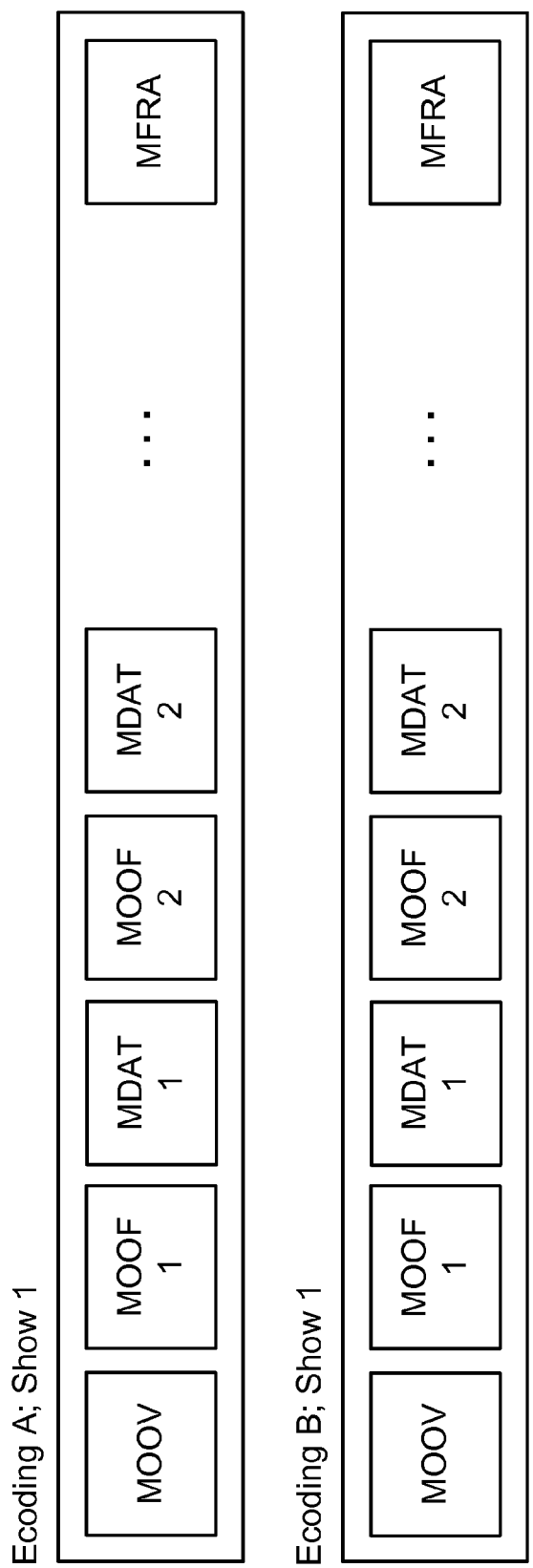
FIG. 5 illustrates examples of files stored by a fragment writer.

FIG. 5 illustrates examples of files stored by the fragment writer. According to various embodiments, the fragment writer is a component in the overall fragmenter. It is a binary that uses command line arguments to record a particular program based on either NTP time from the encoded stream or wallclock time. In particular embodiments, this is configurable as part of the arguments and depends on the input stream. When the fragment writer completes recording a program it exits. For live streams, programs are artificially created to be short time intervals e.g. 5-15 minutes in length.

According to various embodiments, the fragment writer command line arguments are the SDP file of the channel to record, the start time, end time, name of the current and next output files. The fragment writer listens to RTP traffic from the live video encoders and rewrites the media data to disk as fragmented MPEG-4. According to various embodiments, media data is written as fragmented MPEG-4 as defined in MPEG-4 part 12 (ISO/IEC 14496-12). Each broadcast show is written to disk as a separate file indicated by the show ID (derived from EPG). Clients include the show ID as part of the channel name when requesting to view a prerecorded show. The fragment writer consumes each of the different encodings and stores them as a different MPEG-4 fragment.

In particular embodiments, the fragment writer writes the RTP data for a particular encoding and the show ID field to a single file. Inside that file, there is metadata information that describes the entire file (MOOV blocks). Atoms are stored as groups of MOOF/MDAT pairs to allow a show to be saved as a single file. At the end of the file there is random access information that can be used to enable a client to perform bandwidth adaptation and trick play functionality.

According to various embodiments, the fragment writer includes an option which encrypts fragments to ensure stream security during the recording process. The fragment writer will request an encoding key from the license manager. The keys used are similar to that done for DRM. The encoding format is slightly different where MOOF is encoded. The encryption occurs once so that it does not create prohibitive costs during delivery to clients.

The fragment server responds to HTTP requests for content. According to various embodiments, it provides APIs that can be used by clients to get necessary headers required to decode the video, seek to any desired time frame within the fragment and APIs to watch channels live. Effectively, live channels are served from the most recently written fragments for the show on that channel. The fragment server returns the media header (necessary for initializing decoders), particular fragments, and the random access block to clients. According to various embodiments, the APIs supported allow for optimization where the metadata header information is returned to the client along with the first fragment. The fragment writer creates a series of fragments within the file. When a client requests a stream, it makes requests for each of these fragments and the fragment server reads the portion of the file pertaining to that fragment and returns it to the client.

According to various embodiments, the fragment server uses a REST API that is cache friendly so that most requests made to the fragment server can be cached. The fragment server uses cache control headers and ETag headers to provide the proper hints to caches. This API also provides the ability to understand where a particular user stopped playing and to start play from that point (providing the capability for pause on one device and resume on another).

In particular embodiments, client requests for fragments follow the following format:
http://{HOSTNAME}/frag/{CHANNEL}/{BITRATE}/[{ID}/]{COMMAND}[/{ARG}] e.g. http://frag.hosttv.com/frag/1/H8QVGAH264/1270059632.mp4/fragment/42.

According to various embodiments, the channel name will be the same as the backend-channel name that is used as the channel portion of the SDP file. VoD uses a channel name of "vod". The BITRATE should follow the BITRATE/RESOLUTION identifier scheme used for RTP streams. The ID is dynamically assigned. For live streams, this may be the UNIX timestamp; for DVR this will be a unique ID for the show; for VoD this will be the asset ID. The ID is optional and not included in LIVE command requests. The command and argument are used to indicate the exact command desired and any arguments. For example, to request chunk 42 this portion would be "fragment/42".

The URL format makes the requests content delivery network (CDN) friendly because the fragments will never change after this point so two separate clients watching the same stream can be serviced using a cache. In particular, the headend architecture leverages this to avoid too many dynamic requests arriving at the Fragment Server by using an HTTP proxy at the head end to cache requests.

According to various embodiments, the fragment controller is a daemon that runs on the fragmenter and manages the fragment writer processes. We propose that it uses a configured filter that is executed by the Fragment Controller to generate the list of broadcasts to be recorded. This filter integrates with external components such as a guide server to determine which shows to record and the broadcast ID to use.

According to various embodiments, the client includes an application logic component and a media rendering component. The application logic component presents the UI for the user and also communicates to the front-end server to get shows that are available for the user and to authenticate. As part of this process, the server returns URLs to media assets that are passed to the media rendering component.

In particular embodiments, the client relies on the fact that each fragment in a fragmented MPEG-4 file has a sequence number. Using this knowledge and a well defined URL structure for communicating with the server, the client requests fragments individually as if it was reading separate files from the server simply by requesting urls for files associated with increasing sequence numbers. In some embodiments, the client can request files corresponding to higher or lower bit rate streams depending on device and network resources.

Since each file contains the information needed to create the URL for the next file, no special playlist files are needed, and all actions (startup, channel change, seeking) can be performed with a single HTTP request. After each fragment is downloaded the client assesses among other things the size of the fragment and the time needed to download it in order to determine if downshifting is needed, or if there is enough bandwidth available to request a higher bitrate.

Because each request to the server looks like a request to a separate file, the response to requests can be cached in any HTTP Proxy, or be distributed over any HTTP based CDN.

Figure 6:
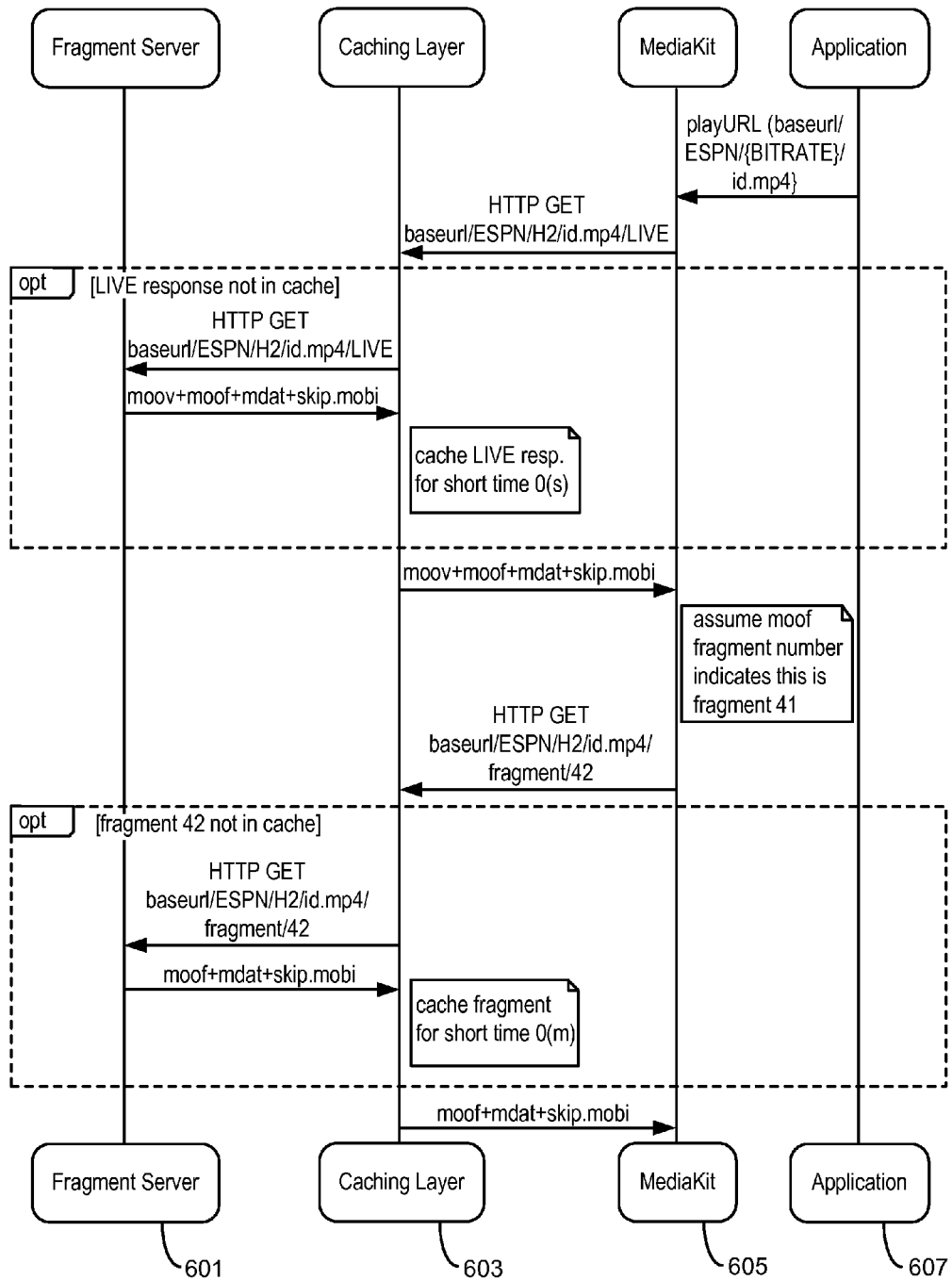
FIG. 6 illustrates one example of an exchange used with a fragmentation system.

FIG. 6 illustrates an interaction for a client receiving a live stream. The client starts playback when fragment plays out from the server. The client uses the fragment number so that it can request the appropriate subsequence file fragment. An application such as a player application 607 sends a request to mediakit 605. The request may include a base address and bit rate. The mediakit 605 sends an HTTP get request to caching layer 603. According to various embodiments, the live response is not in cache, and the caching layer 603 forward the HTTP get request to a fragment server 601. The fragment server 601 performs processing and sends the appropriate fragment to the caching layer 603 which forwards to the data to mediakit 605.

The fragment may be cached for a short period of time at caching layer 603. The mediakit 605 identifies the fragment number and determines whether resources are sufficient to play the fragment. In some examples, resources such as processing or bandwidth resources are insufficient. The fragment may not have been received quickly enough, or the device may be having trouble decoding the fragment with sufficient speed. Consequently, the mediakit 605 may request a next fragment having a different data rate. In some instances, the mediakit 605 may request a next fragment having a higher data rate. According to various embodiments, the fragment server 601 maintains fragments for different quality of service streams with timing synchronization information to allow for timing accurate playback.

The mediakit 605 requests a next fragment using information from the received fragment. According to various embodiments, the next fragment for the media stream may be maintained on a different server, may have a different bit rate, or may require different authorization. Caching layer 603 determines that the next fragment is not in cache and forwards the request to fragment server 601. The fragment server 601 sends the fragment to caching layer 603 and the fragment is cached for a short period of time. The fragment is then sent to mediakit 605.

Figure 7:
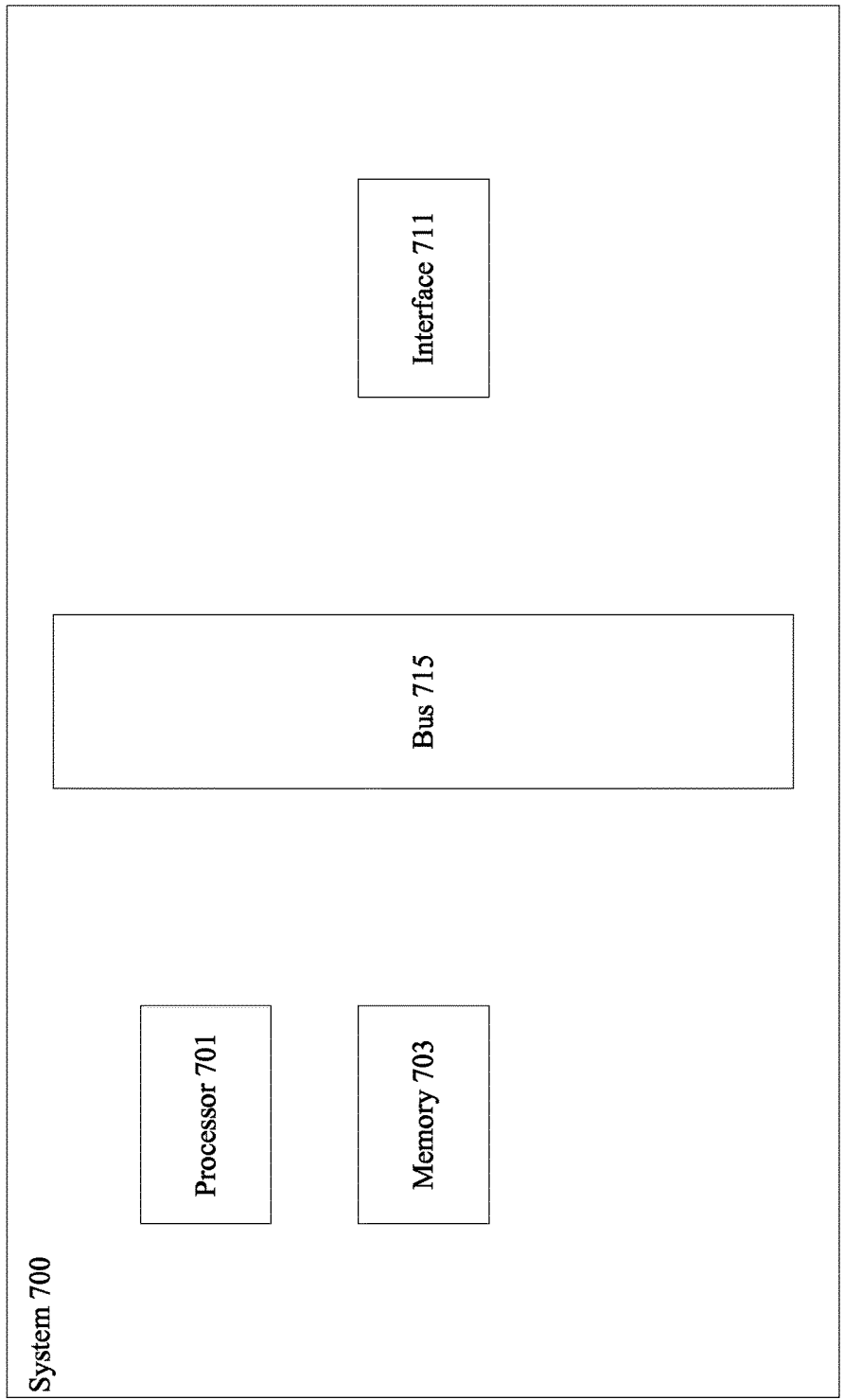
FIG. 7 illustrates one example of a system.

FIG. 7 illustrates one example of a computer system. According to particular embodiments, a system 700 suitable for implementing particular embodiments of the present invention includes a processor 701, a memory 703, an interface 711, and a bus 715 (e.g., a PCI bus or other interconnection fabric) and operates as a streaming server. When acting under the control of appropriate software or firmware, the processor 701 is responsible for modifying and transmitting live media data to a client. Various specially configured devices can also be used in place of a processor 701 or in addition to processor 701. The interface 711 is typically configured to send and receive data packets or data segments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 700 is a fragment server that also includes a transceiver, streaming buffers, and a program guide database. The fragment server may also be associated with subscription management, logging and report generation, and monitoring capabilities. In particular embodiments, functionality for allowing operation with mobile devices such as cellular phones operating in a particular cellular network and providing subscription management. According to various embodiments, an authentication module verifies the identity of devices including mobile devices. A logging and report generation module tracks mobile device requests and associated responses. A monitor system allows an administrator to view usage patterns and system availability. According to various embodiments, the fragment server handles requests and responses for media content related transactions while a separate streaming server provides the actual media streams.

Although a particular fragment server is described, it should be recognized that a variety of alternative configurations are possible. For example, some modules such as a report and logging module and a monitor may not be needed on every server. Alternatively, the modules may be implemented on another device connected to the server. In another example, the server may not include an interface to an abstract buy engine and may in fact include the abstract buy engine itself. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method, comprising:
   delineating, by a GOP delineator, a plurality of live streams including a first live stream into a plurality of groups of pictures (GOPs);
   determining that a first group of pictures (GOP) is available from the GOP delineator;
   placing a plurality of jobs associated with a first GOP into a plurality of job queues, the plurality of jobs corresponding to a plurality of encoding quality levels, the plurality of job queues accessible by a plurality of encoders and fragmentation systems implemented using a plurality of virtual machines in a cloud environment, wherein the cloud environment is dynamically scalable such that additional encoders and fragmentation systems are activated when resource usage in the cloud environment reaches a particular threshold and wherein the additional encoders and fragmentation systems are deactivated when resource usage falls below a particular threshold, wherein the plurality of job queues includes an active job queue and a standby job queue, each job queue being a first in first out queue;
   performing encoding and fragmentation, prior to transmission to a user device, by the plurality of encoders and fragmentation systems at a first encoding quality level to generate a plurality of variants, including the first variant fragment and the second variant fragment;
   transmitting, by the plurality of encoders and fragmentation system, the plurality of encoded fragments to distributed storage;
   maintaining the plurality of encoded fragments in distributed storage, wherein a plurality of user devices playback the live media stream by continuously retrieving encoded fragments from distributed storage, wherein the plurality of encoded fragments are configured such that MPEG-4 files can be created without having to wait until all content is written to prepare movie headers, and wherein each fragment in the plurality of encoded fragments includes a box structure comprising synchronization information, end of file information, and chapter information in order to allow for MPEG-4 fragmentation without out of band signaling.

2. The method of claim 1, wherein the GOP delineator resides in a first data center.

3. The method of claim 2, wherein the plurality of encoders and fragmentation systems reside in a second data center.

4. The method of claim 3, wherein the first GOP is encrypted prior to transmission to the second data center.

5. The method of claim 1, wherein the plurality of encoders and fragmentation systems are dynamically scalable virtual machines.

6. The method of claim 5, wherein an additional virtual machine is added to the plurality of virtual machines when processor resource usage exceeds a particular threshold.

7. The method of claim 5, wherein an additional virtual machine is added to the plurality of virtual machines when the job queue level exceeds a particular threshold.

8. The method of claim 5, wherein an additional virtual machine is added to the plurality of virtual machines when encoding delay exceeds a particular threshold.

9. The method of claim 1, wherein the live media stream received at the GOP delineator is an MPEG-2 live media stream.

10. The method of claim 1, wherein the plurality of encoded fragments is a plurality of MPEG-4 fragments.

11. A system, comprising:
   a GOP delineator configured to delineate a plurality of live streams including a first live stream into a plurality of groups of pictures (GOPs);
   a work dispatcher configured to determine that a first group of pictures (GOP) is available from the GOP delineator, wherein the work dispatcher is further configured to place a plurality of job associated with a plurality of encoding quality levels into plurality of job queues, wherein the plurality of job queues includes an active job queue and a standby job queue, each job queue being a first in first out queue;
   a plurality of encoders and fragmentation systems implemented using a plurality of virtual machines in a cloud environment, wherein the cloud environment is dynamically scalable such that additional encoders and fragmentation systems are activated when resource usage in the cloud environment reaches a particular threshold and wherein the additional encoders and fragmentation systems are deactivated when resource usage falls below a particular threshold, the plurality of encoders and fragmentation systems operable to obtain the job from the plurality of job queues and perform encoding and fragmentation, prior to transmission to a user device, at a first encoding quality level to generate a plurality of variants, the plurality of encoders and fragmentation systems also operable to transmit the plurality of encoded fragments to distributed storage; a distributed storage system configured to maintain the plurality of encoded fragments, wherein a plurality of user devices playback the live media stream by continuously retrieving encoded fragments from distributed storage,
   wherein the plurality of encoded fragments are configured such that MPEG-4 files can be created without having to wait until all content is written to prepare movie headers, and wherein each fragment in the plurality of encoded fragments includes a box structure comprising synchronization information, end of file information, and chapter information in order to allow for MPEG-4 fragmentation without out of band signaling.

12. The system of claim 11, wherein the GOP delineator resides in a first data center.

13. The system of claim 12, wherein the plurality of encoders and fragmentation systems reside in a second data center.

14. The system of claim 13, wherein the first GOP is encrypted prior to transmission to the second data center.

15. The system of claim 11, wherein the plurality of encoders and fragmentation systems are dynamically scalable virtual machines.

16. The system of claim 15, wherein an additional virtual machine is added to the plurality of virtual machines when processor resource usage exceeds a particular threshold.

17. The system of claim 15, wherein an additional virtual machine is added to the plurality of virtual machines when the job queue level exceeds a particular threshold.

18. The system of claim 15, wherein an additional virtual machine is added to the plurality of virtual machines when encoding delay exceeds a particular threshold.

19. The system of claim 11, wherein the live media stream received at the GOP delineator is an MPEG-2 live media stream.

20. A non-transitory computer readable medium comprising:
  computer code for delineating, by a GOP delineator, a plurality of live streams including a first live stream into a plurality of groups of pictures (GOPs);
  computer code for determining that a first group of pictures (GOP) is available from the GOP delineator;
  computer code for placing a plurality of jobs associated with a first GOP into a plurality of job queues, the plurality of jobs corresponding to a plurality of encoding quality levels, the plurality of job queues accessible by a plurality of encoders and fragmentation systems implemented using a plurality of virtual machines in a cloud environment, wherein the cloud environment is dynamically scalable such that additional encoders and fragmentation systems are activated when resource usage in the cloud environment reaches a particular threshold and wherein the additional encoders and fragmentation systems are deactivated when resource usage falls below a particular threshold, wherein the plurality of job queues includes an active job queue and a standby job queue, each job queue being a first in first out queue;
  computer code for performing encoding and fragmentation, prior to transmission to a user device, by the plurality of encoders and fragmentation systems at a first encoding quality level to generate a plurality of variants, including the first variant fragment and the second variant fragment
  computer code for transmitting, by the plurality of encoders and fragmentation system, the plurality of encoded fragments to distributed storage;
  computer code for maintaining the plurality of encoded fragments in distributed storage, wherein a plurality of user devices playback the live media stream by continuously retrieving encoded fragments from distributed storage, wherein the plurality of encoded fragments are configured such that MPEG-4 files can be created without having to wait until all content is written to prepare movie headers, and wherein each fragment in the plurality of encoded fragments includes a box structure comprising synchronization information, end of file information, and chapter information in order to allow for MPEG-4 fragmentation without out of band signaling.

* * * * *